United States Patent

Jacobs

[19]

[11] Patent Number: 5,931,939
[45] Date of Patent: *Aug. 3, 1999

[54] READ CROSSBAR ELIMINATION IN A VLIW PROCESSOR

[75] Inventor: Eino Jacobs, Belmont, Calif.

[73] Assignee: Philips Electronics North America Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/909,273

[22] Filed: Aug. 11, 1997

Related U.S. Application Data

[60] Provisional application No. 60/027,097, Sep. 25, 1996.

[51] Int. Cl.$^6$ ................................. G06F 9/34; G06F 9/44
[52] U.S. Cl. ............................. 712/24; 712/215; 712/226
[58] Field of Search ..................... 395/588, 391, 395/500, 803.33, 571, 582, 567, 381, 395, 378, 370, 800.24; 364/DIG. 1, DIG. 2; 712/24, 25, 215, 226, 23

[56] References Cited

U.S. PATENT DOCUMENTS

| | | | |
|---|---|---|---|
| 5,103,311 | 4/1992 | Sluijter et al. | 348/571 |
| 5,313,551 | 5/1994 | Labrousse et al. | 395/500 |
| 5,333,280 | 7/1994 | Ishikawa et al. | 395/588 |
| 5,574,939 | 11/1996 | Keckler et al. | 364/DIG. 1 |

FOREIGN PATENT DOCUMENTS

| | | |
|---|---|---|
| 0479390A2 | 4/1992 | European Pat. Off. . |
| 0605927A1 | 7/1994 | European Pat. Off. . |

*Primary Examiner*—Daniel H. Pan
*Attorney, Agent, or Firm*—Anne E. Barschall

[57] ABSTRACT

In a VLIW processor that has an instruction issue register, functional units, and a multiport register file, a portion or all of the read crossbar is eliminated.

6 Claims, 2 Drawing Sheets

READ CROSSBAR ELIMINATION IN A VLIW PROCESSOR

RELATED APPLICATIONS

The present application claims the benefit of provisional application Ser. No. 60/027,097 filed Sep. 25, 1996.

BACKGROUND OF THE INVENTION

A. Field of the Invention

The invention relates to the field of architecture of Very Long Instruction Word (VLIW) processors.

B. Related Art

The invention is an improvement on U.S. application Ser. No. 08/445,963 filed May 22, 1995, now abandoned, (PHA 21,777a) which is incorporated herein by reference.

Prior art VLIW processors can be as shown in FIG. 1. They are characterized by having an instruction issue register (IIR) 104 having a plurality of issue slots. Each issue slot is for containing a respective operation. All of the operations which are held simultaneously in the instruction issue register are to be begun in a same machine cycle. Each operation is to be executed on an appropriate one of the functional units FU1, FU2, . . . , FUN. The operations are RISC-type operations, in that an operation can be begun in each machine cycle for each slot of the IIR.

The VLIW processor includes a multiport register file 101. This multiport register file 101 stores operands destined for the functional units FU1, FU2, . . . , FUN and results produced by the functional units.

A read crossbar 102 directs operands from the multiport register file 101 to appropriate ones of the functional units FU1, FU2, . . . , FUN under control of signals from the instruction issue register 104.

A write control unit 103 governs timing of writing of results from the functional units FU1, FU2, . . . , FUN to the multiport register file 101.

It is a disadvantage of the prior art that the read crossbar 102 takes up a lot of real estate on the processor chip.

SUMMARY OF THE INVENTION

It is an object of the invention to make the VLIW processor fit in a smaller space.

The object of the invention is achieved by assigning functional units to particular issue slots in the instruction register so that the read cross bar can be simplified or eliminated.

The processor of the invention differs from prior art processors in which there was one issue slot per functional unit, see e.g. U.S. Pat. No. 5,103,311 (PHN 12,376a), in that the groupings of the functional units in the invention does not result in each group of functional units becoming a super unit. The units still function separately. They execute distinct operation types. They have distinct instruction latencies and distinction connections to the write control unit.

III. BRIEF DESCRIPTION OF THE DRAWING

The invention will now be described by way of non-limitative example with reference to the following drawings.

IV. DETAILED DESCRIPTION OF THE PREFERRED EMBODIMENTS

Figure 1:
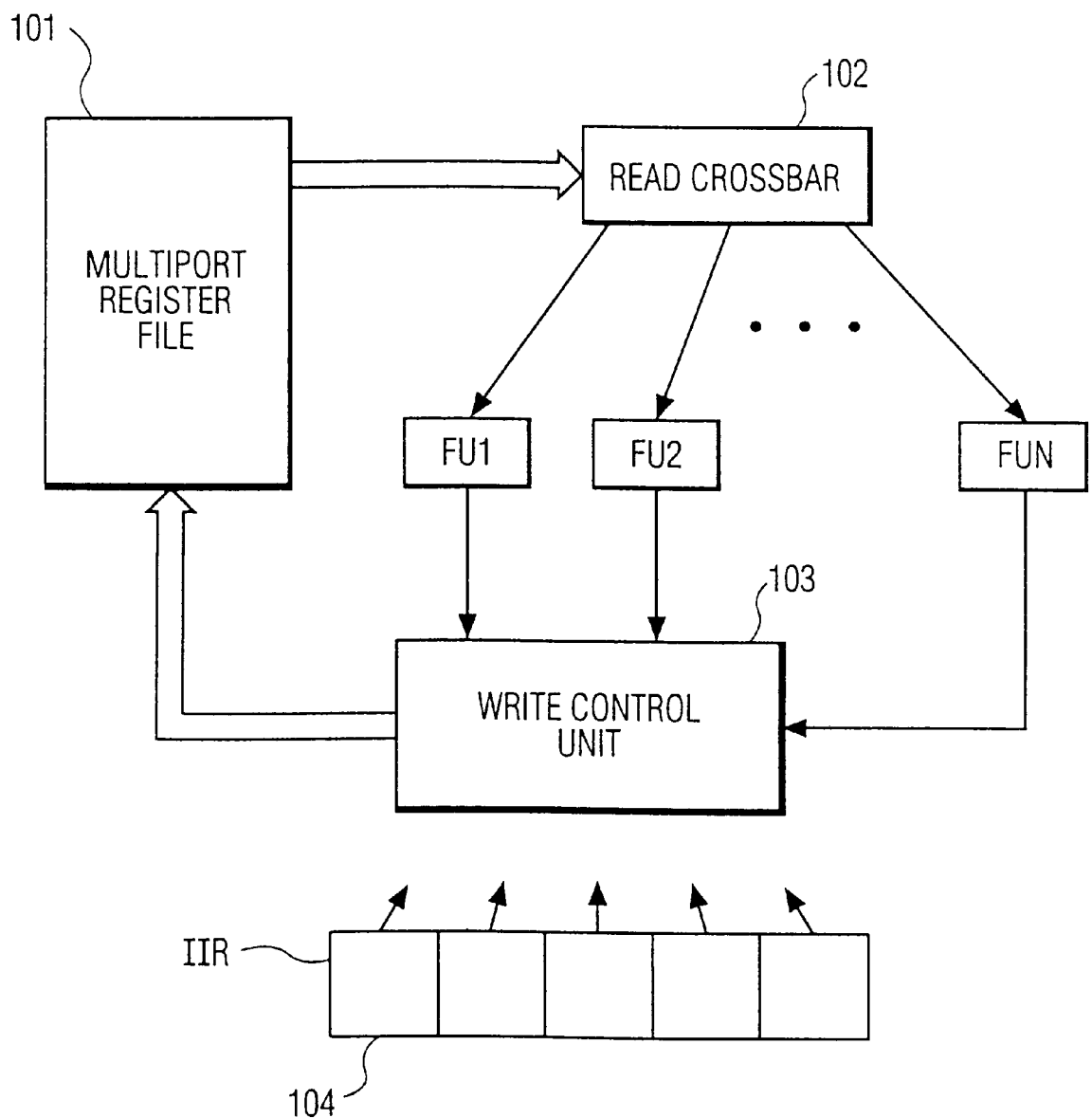
FIG. 1 shows a prior art VLIW processor.
Figure 2:
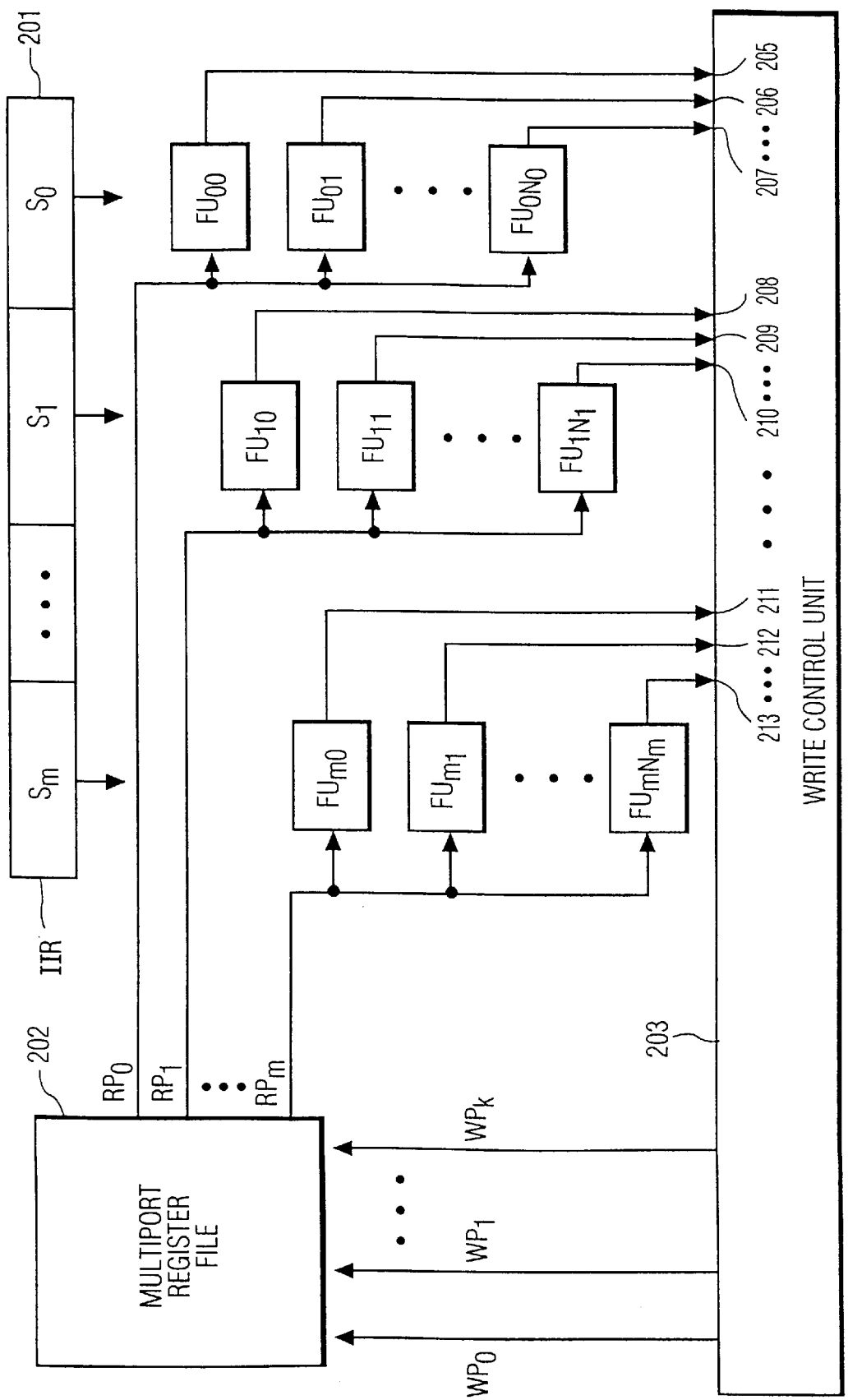
FIG. 2 shows a VLIW processor according to the invention.

FIG. 2 shows a VLIW processor according to the invention.

The processor has an IIR 201 with m issue slots, $S_0$, $S_1$, . . . , $S_m$, where m is an integer greater than one. Each slot is for holding an operation to be performed on the functional units. As before, all the operations which are held simultaneously in the IIR are to be begun in a same machine cycle and all of the operations are RISC-like.

As before, there is a multiport register file 202. This file has the same number, m, of read ports, $RP_0$, $RP_1$, . . . , $RP_m$, as there are issue slots. This file has k write ports where k may or may not be the same as m. More information about multiport register files can be found in U.S. patent application Ser. No. 08/366,958 filed Dec. 30, 1994, which is incorporated herein by reference, though the term read port as used herein includes any operand or guard bit read ports, as those terms are defined in U.S. patent application Ser. No. 08/366,958, filed on Dec. 30, 1994, now abandoned, necessary for execution of an operation.

Each read port has a respective group of at least one functional unit which reads from that port. For instance, the drawing illustrates functional units $FU_{00}$, $FU_{01}$, . . . , $FU_{0N_0}$ that read from $RP_0$; functional units $FU_{01}$, $FU_{11}$, . . . , $FU_{1N_1}$ that read from $RP_1$; and function units $FU_{m0}$, $FU_{m1}$, . . . , $FU_{mN_m}$ that read from $RP_m$.

Write buses, 205, 206, . . . , 207, 208, 209, . . . , 210, . . . , 211, 212, . . . , 213, convey result data from the functional units to write control unit 203. Write control unit 203, as in U.S. patent application Ser. No. 08/445,963, determines when to route result data from the write buses to the multiport register file 202 and onto which write ports to route result data.

In a sample VLIW processor with m=5 and 19 total functional units, a full read crossbar requires 95 connections. Each connection requires a set of two 32 bit read buses, i.e. a 64 bit connection plus some switching circuitry, as shown in U.S. patent application Ser. No. 08/445,963. It was found, as further explained below, that a limited crossbar requires 35 connections and no scheduling restrictions. In a limited crossbar only some inputs of functional units are connected to a particular output of the multiport register file, or, alternatively, only some outputs of the multiport register file are connected to some functional units. Limited crossbars would be constructed in accordance with the crossbar principles illustrated in U.S. patent application Ser. No. 08/445, 963, now abandoned, and U.S. Pat. No. 5,313,551, which is incorporated herein by reference.

With the crossbar eliminated entirely there were 19 connections to functional units, i.e. the same number of connections as there were functional units. Some modest scheduling restrictions were required from the compiler as a result of eliminating the crossbar. Reduced complexity of the crossbar leads to reduction of the critical timing path, chip area, design complexity and dissipation.

The following are some examples of assignment of functional units to issue slots in a VLIW processor.

In the following tables the following abbreviations are used:

| | |
|---|---|
| const | This is a unit which passes a constant to the write bus. |

| | |
|---|---|
| alu | arithmetic and logic unit |
| shift | shifter |
| mult | multiplier |
| falu | floating point alu |
| fcomp | floating point compare |
| fmult | floating point multiplier |
| fdivid | floating point divider |
| fsqroot | floating point square root |
| mem | memory |
| branch | unit for executing branches |

+ indicates that a connection is possible between the functional unit in the left column and the issue slot that has the + in its column. A blank indicates that there is no connection.

TABLE I (partial crossbar embodiment)

| | which issue slot can use this FU | | | | |
|---|---|---|---|---|---|
| Functional unit # & type | 0 | 1 | 2 | 3 | 4 |
| C1:const | + | | + | | + |
| C2:const | | + | | + | |
| A1:ALU | + | | | | |
| A2:ALU | | + | | | |
| A3:ALU | | | + | | |
| A4:ALU | | | | + | |
| A5:ALU | | | | | + |
| S1:shift | | + | | + | |
| S2:shift | + | | + | | + |
| M1:mult | | + | | + | |
| M2:mult | + | | + | | + |
| falu | + | + | + | + | + |
| FC: fcomp | + | + | + | + | + |
| FM: fmult | + | + | + | + | + |
| FD: fdivid | + | + | + | + | + |
| FS: fsqroot | + | + | + | + | + |
| DM: mem | + | + | + | + | + |
| B1: branch | + | | + | | + |
| B2: branch | | + | | + | |

This partial crossbar embodiment would require 55 connections and not require any scheduling restrictions, beyond what is inherent from the number of functional units. It is not necessary to be able to connect every functional unit to every issue slot if there are multiple units of the same type. For instance, if we want to schedule a "const" operation in issue slot 0 we can always connect it with C1. A connection with C2 is superfluous.

TABLE II (PARTIAL CROSSBAR IMPLEMENTATION)

| | which issue slot can use this FU | | | | |
|---|---|---|---|---|---|
| Functional unit # & type | 0 | 1 | 2 | 3 | 4 |
| C1:const | + | | + | | + |
| C2:const | | + | | + | |
| A1:alu | + | | | | |
| A2:alu | | + | | | |
| A3:alu | | | + | | |
| A4:alu | | | | + | |
| A5:alu | | | | | + |
| S1:shift | | + | | + | |
| S2:shift | + | | + | | + |
| M1:mult | | + | | + | |
| M2:mult | | | + | | + |
| FA: falu | | + | | | |
| FC: fcomp | | | + | | |
| FM: fmult | | | | + | |
| FD: fdivid | | | | | + |
| FS: fsqroot | + | + | + | + | + |
| DM: mem | + | | | | |
| B1:branch | + | | + | | + |
| B2:branch | | + | | + | |

This embodiment reduces the number of connections by recognizing that there are only five issue slots and that therefore certain instruction combinations are not necessary. In this embodiment, only 35 connections are required, and still no scheduling restrictions, beyond those inherent in the number of functional units. In other words, clearly if there is only one floating point multiply unit, only one floating point multiply operation can appear in any instruction.

The term "scheduling restrictions" herein means the number of a particular class of operations which can appear in a same instruction. A restriction on which issue slot can contain an operation is not considered a scheduling restriction. Thus, it is possible to schedule operations in such a way that, for example, an "falu" operation is always in slot 1 and a "mem" operation is always in slot 0, without limiting which operations can occur simultaneously in one instruction. Therefore "falu" only needs a connection to issue slot 1.

TABLE III (PARTIAL CROSSBAR)

| | which issue slot can use this FU | | | | |
|---|---|---|---|---|---|
| Functional unit # & type | 0 | 1 | 2 | 3 | 4 |
| C1:const | + | | + | | + |
| C2:const | | + | | + | |
| A1:alu | + | | | | |
| A2:alu | | + | | | |
| A3:alu | | | + | | |
| A4:alu | | | | + | |
| A5:alu | | | | | + |
| S1:shift | | + | | + | |
| S2:shift | + | | + | | + |
| M1:mult | + | | + | | + |
| M2:mult | | | + | | + |
| FA: falu | | + | | | |
| FC: fcomp | | | + | | |
| FM: fmult | | | | + | |
| FD: fdivid | | | | | + |
| FS: fsqroot | | | | | + |
| DM: mem | + | | | | |
| B1:branch | + | | + | | + |
| B2:branch | | + | | + | |

This embodiment would reduce the number of connections to 31, but an additional scheduling restriction would need to be imposed. A floating point square root operation would not be able to appear in the same instruction with a floating point divide.

TABLE IV (PARTIAL CROSSBAR)

which issue slot can use this FU

| Functional unit # & type | 0 | 1 | 2 | 3 | 4 |
|---|---|---|---|---|---|
| C1:const | + |   | + |   | + |
| C2:const |   | + |   | + |   |
| A1:alu | + |   |   |   |   |
| A2:alu |   | + |   |   |   |
| A3:alu |   |   | + |   |   |
| A4:alu |   |   |   | + |   |
| A5:alu |   |   |   |   | + |
| S1:shift |   | + |   |   |   |
| S2:shift |   |   | + |   |   |
| M1:mult |   |   |   |   | + |
| M2:mult |   |   |   | + |   |
| FA: falu |   | + |   |   |   |
| FC: fcomp |   |   | + |   |   |
| FM: fmult |   |   |   | + |   |
| FD: fdivid |   |   |   |   | + |
| FS: fsqroot |   |   |   |   | + |
| DM: mem | + |   |   |   |   |
| B1:branch | + |   | + |   | + |
| B2:branch |   | + |   | + |   |

This embodiment would reduce the number of connections to 25, but impose the following additional scheduling restrictions over the embodiment of Table III. In the following examples, as more and more connections are eliminated, cumulative scheduling restrictions must be imposed.

a) allow 2 operations out of S1, S2, falu, fcomp; and b) allow 2 operations out of M1, M2, fmult, fdivid, fsqroot.

TABLE V (PARTIAL CROSSBAR)

which issue slot can use this FU

| Functional unit # & type | 0 | 1 | 2 | 3 | 4 |
|---|---|---|---|---|---|
| C1:const | + |   | + |   | + |
| C2:const |   | + |   | + |   |
| A1:alu | + |   |   |   |   |
| A2:alu |   | + |   |   |   |
| A3:alu |   |   | + |   |   |
| A4:alu |   |   |   | + |   |
| A5:alu |   |   |   |   | + |
| S1:shift |   | + |   |   |   |
| S2:shift |   |   | + |   |   |
| M1:mult |   |   |   | + |   |
| M2:mult |   |   | + |   |   |
| FA: falu |   | + |   |   |   |
| FC: fcomp |   |   |   | + |   |
| FM: fmult |   |   | + |   |   |
| FD: fdivid |   |   |   | + |   |
| FS: fsqroot |   |   | + |   |   |
| DM: mem | + |   |   |   |   |
| B1:branch | + |   | + | + |   |
| B2:branch |   | + |   | + |   |

This embodiment reduces the number of connections to 22 and imposes the following additional schedule limitation compared with the previous table: allow 2 operations out of C1, C2, M1, M2, fmult, fdivid, fsqroot.

TABLE VI (CROSSBAR ELIMINATION)

which issue slot can use this FU

| Functional unit # & type | 0 | 1 | 2 | 3 | 4 |
|---|---|---|---|---|---|
| C1:const |   |   |   |   | + |
| C2:const |   |   |   | + |   |
| A1:alu | + |   |   |   |   |
| A2:alu |   | + |   |   |   |
| A3:alu |   |   | + |   |   |
| A4:alu |   |   |   | + |   |
| A5:alu |   |   |   |   | + |
| S1:shift |   | + |   |   |   |
| S2:shift |   |   | + |   |   |
| M1:mult |   |   |   |   | + |
| M2:mult |   |   |   | + |   |
| FA: falu |   | + |   |   |   |
| FC: fcomp |   |   | + |   |   |
| FM: fmult |   |   | + |   |   |
| FD: fdivid |   |   |   |   | + |
| FS: fsqroot |   |   |   |   | + |
| DM: mem | + |   |   |   |   |
| B1:branch |   |   |   | + |   |
| B2:branch |   |   | + |   |   |

This configuration has the minimum number of connections for 19 functional units, namely 19 connections. Moreover every functional unit is connected to only one issue slot. This configuration requires the following additional constraint over the previous configuration: allow 2 operations out of B1, B2, S1, S2, falu, fcomp.

Which and how many functional units should be assigned to which slot of the instruction issue register must be determined empirically based upon processor cost and experience of the optimality of processor function running sample programs. For instance, the number of floating point units should be minimized as these are expensive.

In the preferred embodiment of the invention, where m=5 and k=5, there are 28 functional units. It was determined that an ALU and a constant unit had to be attached to each issue slot in order to avoid an unacceptable number of scheduling restrictions.

The functional unit types in the preferred embodiment are defined in the following table:

TABLE VI (functional unit types)

| Type | abbreviation | latency | typical operations |
|---|---|---|---|
| constant | const | 1 | transfers an opcode modifier to a register |
| alu | alu | 1 | integer add and subtract, integer and unary comparisons, boolean, half word extension, borrow and carry, merge and pack, byte selection, immediate operations conditioned on operands |
| digital signal processing alu | dspalu | 2 | clipping including clipped sums and differences and absolute values, averages, twos complements conditioned on operands, operations choosing the larger or smaller of two operands; plural parallel operations of the foregoing types on pairs of subsets of operand words, |
| digital signal processing multiplier | dspmul | 3 | plural parallel multiplies on pairs of subsets of operand words and summations of same |

TABLE VI-continued (functional unit types)

| Type | abbreviation | latency | typical operations |
|---|---|---|---|
| data memory | dmem | 3 | loads and stores including whole words and parts of words |
| data memory special | dmemspec | 3 | data cache operations such as copies, invalidation of blocks, identification of address tags, reading status bits, prefetches, and allocations |
| shifter | shift | 1 | arithmetic and logical shifts and rotations, including shifts of concatenations of operands |
| branch | branch | 3 | all sorts of jumps, invalidation of instruction cache blocks |
| floating point alu | falu | 3 | floating point addition and subtraction and absolute values; conversions between floating point and integer values and vice versa, predetermination of exceptions that would result from calculations and conversions performable in this unit |
| integer and floating point multiply | ifmul | 3 | floating point, integer, and unary multiplies including with truncation of results; predetermination of exceptions that would result from multiplies |
| floating point compare | fcomp | 1 | floating point comparisons, determination of signs of floating point numbers; predetermination of exceptions that would result from performing floating point compares and determination of signs; read or write the program status word, destination program counter or source program counter; samples of the hardware clock cycle counter |
| tough floating point multiplies | ftough | 17 | floating point divides and square roots; predetermination of flags that would result from same |

These functional units are connected to the issue slots according to the following table.

TABLE VIII (Crossbar elimination)

| | which issue slot can use this FU | | | | |
|---|---|---|---|---|---|
| Functional unit # & type | 0 | 1 | 2 | 3 | 4 |
| C1: const | | | | | + |
| C2: const | | | | + | |
| C3: const | | | + | | |
| C4: const | | + | | | |
| C5: const | + | | | | |
| A1: alu | | | | | + |
| A2: alu | | | | + | |
| A3: alu | | | + | | |
| A4: alu | | + | | | |
| A5: alu | + | | | | |
| D1: dmem | | | | | + |
| D2: dmem | | | | + | |
| dmemspec | | | | | + |
| S1: shift | | | + | | |
| S2: shift | | + | | | |
| P1: dspalu | | | + | | |
| P2: dspalu | | + | | | |
| M1: dspmul | | | + | | |
| M2: dspmul | | + | | | |
| B1: branch | | | | | + |

TABLE VIII-continued (Crossbar elimination)

| | which issue slot can use this FU | | | | |
|---|---|---|---|---|---|
| Functional unit # & type | 0 | 1 | 2 | 3 | 4 |
| B2: branch | | | + | | |
| B3: branch | | + | | | |
| FA1: falu | | | | | + |
| FA2: falu | + | | | | |
| IF1: ifmul | | | + | | |
| IF2: ifmul | | | + | | |
| FC: fcomp | | | | + | |
| FT: ftough | | | + | | |

With this machine configuration, a great number of minor scheduling restrictions apply, in addition to those obviously imposed by the number of functional units. These restrictions lead to almost no performance loss on real applications. Examples of scheduling restrictions are:

TABLE IX

| numerical limitation of operations that can be in a single instruction from a specified set of functional units | set of functional units to which the numerical limitation in the previous column applies |
|---|---|
| 2 | IF1, 1F2, FC, FT |
| 4 | D1, D2, B1, B2, B3 |
| 3 | D1, D2, FA1, FA2 |
| 3 | S1, S2, P1, P2 |
| 3 | P1, P2, M1, M2 |
| 4 | P1, P2, B1, B2, B3 |
| 4 | P1, F2, M1, M2, B1, B2, B3 |

Each VLIW instruction on this processor must satisfy all of the concurrent scheduling restrictions which result from the elimination of the crossbar. However, the above list is not a complete list of such restrictions. Processing an exhaustive list of scheduling restrictions is not the most efficient way to compile instructions for a processor according to the invention. Those of ordinary skill in the art can readily satisfy the scheduling constraints by designing a compiler to check each proposed compiled instruction against TABLE VIII to verify that that instruction can run.

What is claimed is:

1. A VLIW processor comprising a plurality of functional units;

an instruction issue register having a plurality of issue slots, each issue slot being for containing a respective operation, all operations which are held simultaneously in the instruction issue register being for commencement on the functional units in a same machine cycle, the instruction issue register being suitable for filling with a new set of operations with each machine cycle, the number of issue slots being less than the number of functional units; and a multiport register file, coupled to provide operands to the functional units via a plurality of read ports and to receive results from the functional units via a plurality of write ports, the number of read ports being related to the number of issue slots in the instruction issue register;

wherein at least one of the functional units is coupled to receive operands from less than all of the read ports.

2. The processor of claim 1 wherein each functional unit is coupled with one and only one respective one of the read ports.

3. The processor of claim 2 wherein the functional units include a number of constant units which is the same as the number of issue slots.

4. The processor of claim 2 wherein the functional units include a number of alu's which is the same as the number of issue slots.

5. The processor of claim 1 wherein at least two of the functional units share at least one of the read ports.

6. A VLIW processor comprising a plurality of functional units;

an instruction issue register having a plurality of issue slots, each issue slot being for containing a respective operation, all operations which are held simultaneously in the instruction issue register being for commencement on the functional units in a same machine cycle, the instruction issue register being suitable for filling with a new set of operations with each machine cycle, the number of issue slots being less than the number of functional units; and a multiport register file, coupled to provide operands to the functional units via a plurality of read ports and to receive results from the functional units via a plurality of write ports, the number of read ports being related to the number of issue slots in the instruction issue register;

wherein at least one of the functional units is coupled so as to be unable ever to receive operands from at least one of the read ports.

* * * * *